(12) United States Patent
Wang

(10) Patent No.: US 12,206,917 B2
(45) Date of Patent: *Jan. 21, 2025

(54) VIDEO INFORMATION PERIODIC BROADCASTING METHOD AND APPARATUS, AND VIDEO INFORMATION RECEIVING METHOD AND APPARATUS

(71) Applicants: NANJING SUPERCOHESION COMMUNICATION SCIENCE & TECHNOLOGY CO., LTD., Nanjing (CN); TSINGHUA SHENZHEN INTERNATIONAL GRADUATE SCHOOL, Shenzhen (CN)

(72) Inventor: Xingjun Wang, Shenzhen (CN)

(73) Assignees: NANJING SUPERCOHESION COMMUNICATION SCIENCE & TECHNOLOGY CO., LTD., Nanjing (CN); TSINGHUA SHENZHEN INTERNATIONAL GRADUATE SCHOOL, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/182,718

(22) Filed: Mar. 13, 2023

(65) Prior Publication Data
US 2023/0224517 A1    Jul. 13, 2023

Related U.S. Application Data

(63) Continuation of application No. 17/298,347, filed as application No. PCT/CN2019/113722 on Oct. 28, 2019, now Pat. No. 11,606,585.

(30) Foreign Application Priority Data

Nov. 30, 2018    (CN) .......................... 201811459920.4

(51) Int. Cl.
*H04N 21/2343*    (2011.01)
*H04N 21/239*    (2011.01)
(Continued)

(52) U.S. Cl.
CPC ..... *H04N 21/2343* (2013.01); *H04N 21/2393* (2013.01); *H04N 21/2402* (2013.01);
(Continued)

(58) Field of Classification Search
CPC ....................... H04N 21/2385; H04N 21/2187
(Continued)

(56) References Cited

U.S. PATENT DOCUMENTS 5,936,659 A    8/1999    Viswanathan et al.

FOREIGN PATENT DOCUMENTS

CN    105392068 A    3/2016
KR    101211768 B1    12/2012

OTHER PUBLICATIONS

Li-Shen Jun et.al. "Harmonic Broadcasting for Video-on-Demand Service" IEEE Transactions on Broadcasting, vol. 43, No. 3, Sep. 30, 1997 (Sep. 30, 1997), pp. 268-271 (Year: 1997).*

(Continued)

*Primary Examiner* — Alfonso Castro
(74) *Attorney, Agent, or Firm* — HAUPTMAN HAM, LLP

(57) ABSTRACT

A video information periodic broadcasting method includes segmenting video information with an equal duration to obtain video segments $S_i$ of each time series, where i is the segment serial number of the video segments. The video segments $S_i$ are connected in series in an order of ascending the segment serial numbers. Segmenting each video segment $S_i$ with an equal duration to obtain video sub-segments $S_{i,j}$ of each time series, where the number of the video sub-segments $S_{i,j}$ of each time series is equal to the segment
(Continued)

serial number of the video segments corresponding to the same time series, j is the sub-segment serial numbers of all the video sub-segments of the video segment. The video sub-segments $S_{i,j}$ are connected in series in an order of ascending the sub-segment serial numbers to form the video segment $S_i$. Transmitting the video sub-segments through multiple periodic broadcasting channels with an equal bandwidth.

6 Claims, 12 Drawing Sheets

(51) Int. Cl.
    *H04N 21/24*     (2011.01)
    *H04N 21/2662*     (2011.01)
    *H04N 21/4402*     (2011.01)
    *H04N 21/845*     (2011.01)

(52) U.S. Cl.
    CPC ..... *H04N 21/2662* (2013.01); *H04N 21/4402* (2013.01); *H04N 21/8456* (2013.01)

(58) Field of Classification Search
    USPC .................................................. 725/116, 131
    See application file for complete search history.

(56) References Cited

OTHER PUBLICATIONS

Amotz Bar-Noy, et al., Scheduling Techniques for Media-on-Demand, Algorithmica 52, p. 13-439, 2008. (Year: 2008).*
Yu-Chee Tseng et al., Seamless Channel Transition for the Staircase Video Broadcasting Scheme, IEEE/ACM Transactions on Networking, vol. 12, No. 3, Jun. 2004 (Year: 2004).*
Juhn, Li-Shen et al., "Harmonic Broadcasting for Video-on-Demand Service", IEEE Transactions on Broadcasting, vol. 43, No. 3, Sep. 30, 1997, pp. 268-271.
Written Opinion issued in corresponding International Application No. PCT/CN2019/113722; mailed Jan. 16, 2020; China National Intellectual Administration, Beijing, China, 5 pgs.
International Search Report issued in corresponding International Application No. PCT/CN2019/113722; mailed Jan. 16, 2020; China National Intellectual Administration, Beijing, China, 6 pgs.
Tseng, Yu-Chee, et al; Seamless Channel Transition for the Staircase Video Broadcasting Scheme, IEEE/ACM Transactions on Networking, vol. 12, No. 3, Jun. 2004; pp. 559-571.
Bar-Noy, Amotz, et al; Scheduling Techniques for Media-on-Demand, Algorithmica 52, Mar. 5, 2007; 27 pgs.

* cited by examiner

| SlotID | 1 | 2 | 3 | 4 | 5 | 6 | |
|---|---|---|---|---|---|---|---|
| $C_1$: | $S_1$ | $S_1$ | $S_1$ | $S_1$ | $S_1$ | $S_1$ | $b$ |
| $C_2$: | $S_{2,1}$ | $S_{2,2}$ | $S_{2,1}$ | $S_{2,2}$ | $S_{2,1}$ | $S_{2,2}$ | $b/2$ |
| $C_3$: | $S_{3,1}$ | $S_{3,2}$ | $S_{3,3}$ | $S_{3,1}$ | $S_{3,2}$ | $S_{3,3}$ | $b/3$ |
| $C_4$: | $S_{4,1}$ | $S_{4,2}$ | $S_{4,3}$ | $S_{4,4}$ | $S_{4,5}$ | $S_{4,6}$ | $b/4$ |

# VIDEO INFORMATION PERIODIC BROADCASTING METHOD AND APPARATUS, AND VIDEO INFORMATION RECEIVING METHOD AND APPARATUS

RELATED APPLICATIONS

The present application is a Continuation of U.S. application Ser. No. 17/298,347, filed May 28, 2021, which is a National Phase of International Application Number PCT/CN2019/113722 filed Oct. 28, 2019, and claims priority to Chinese Application Number 201811459920.4 filed Nov. 30, 2018, the disclosures of which are hereby incorporated by reference in their entireties.

TECHNICAL FIELD

The present application relates to the technical field of multimedia, and in particular, to a video information periodic broadcasting method and apparatus, and a video information receiving method and apparatus.

BACKGROUND

As Internet high-definition videos are applied more widely, the requirements for network bandwidths may also be increasingly high. When the conventional network requirements cannot meet the increasing bandwidth demand, it is necessary to increase the number of Content Delivery Networks (CDN); however, the increase in the number of CDN networks requires increased server investment and other costs, and consumes a lot of electricity.

In Internet traffic, video applications account for an extremely high volume of traffic, accounting for about 80% of the Internet traffic, while popular videos account for 90% of total video traffic.

For the early traditional broadcasting system, only one program is transmitted per channel. In order to reduce the waiting time for users, some conventional broadcasting solutions are improved, and multiple channels are allocated to broadcast a same program.

To achieve the effect of Video-On-Demand (VOD), the conventional broadcasting solutions needs to consume huge bandwidth resources. To save bandwidths, some people have proposed a Pyramid Broadcasting (PB)-based solution.

PB transmits those popular video programs using multiple channels, and at the same time, reduces the user's waiting time and bandwidth demand to the original square root size by taking advantage of the terminal's caching capabilities.

In the PB solution, if the bandwidth allocated is larger, the user's waiting time may be improved exponentially. However, if the bandwidth allocated to each video program is not large enough, the PB solution has little improvement in the user's waiting time.

Under the condition that the size of the bandwidth allocated is determined, in order to reduce the user's waiting time, some people have proposed a Harmonic Broadcasting (HB) solution. The HB solution first segments a video into one or more segments with an equal duration, respectively denoted by a first segment, a second segment, a third segment, . . . , and the last segment. The durations of any two segments are equal. Then any segment is horizontally and equally segmented into multiple sub-segments, respectively denoted by a first sub-segment of the segment, a second sub-segment of the segment, . . . , and the last sub-segment of the segment. All sub-segments of each segment are placed in a certain logic channel in an order of ascending the serial numbers. The bandwidth of the logic channel is limited to a small value. In the logic channel, each sub-segment is periodically broadcast.

When the total bandwidth allocated is determined, the user's waiting time of the HB solution is the theoretical lower limit of all broadcasting solutions. However, the video segmentation mode in the HB solution is horizontal segmentation, which is difficult to achieve. Moreover, the number of logic channels in the HB solution increases linearly with the increase in the number of segments. When the number of segments is large, such a channel design needs to consume lots of additional resources to maintain each channel.

SUMMARY

An objective of embodiments of the present application is to provide a video information periodic broadcasting method and apparatus, and a video information receiving method and apparatus, which allow multiple users to share channel resources, reduce overall video data traffic, and do not need to consume additional resources to maintain the logic of each channel.

To achieve the foregoing objective, the embodiments of the present application provide a video information periodic broadcasting method, including:
  segmenting video information with an equal duration to obtain video segments $S_i$ of each time series, where i is the segment serial number of the video segments, all the video segments $S_i$ are connected in series in an order of ascending the segment serial numbers to form the video information, and the time series is a duration of each video segment $S_i$ of a video program;
  segmenting each video segment $S_i$ with an equal duration to obtain video sub-segments $S_{i,j}$ of each time series, where the number of the video sub-segments $S_{i,j}$ of each time series is equal to the segment serial number of the video segments corresponding to the same time series, i is the segment serial number of the video segments, j is the sub-segment serial numbers of all the video sub-segments of the video segment, and all the video sub-segments are connected in series in an order of ascending the sub-segment serial numbers to form the video segment $S_i$; and
  transmitting the video sub-segments of all the time series through at least two periodic broadcasting channels to implement video information periodic broadcasting.

To achieve the foregoing objective, the embodiments of the present application provide a video information receiving method, including:
  generating a video download request;
  determining, when a starting point of any one video sub-segment appears in any one periodic broadcasting channel, whether the video sub-segment is completely received in a time period of each time series by taking a generation moment of the video download request as a starting time; and
  receiving, according to a determination result, the video sub-segment from the corresponding periodic broadcasting channel starting from a starting point of a video sub-segment that is not completely received.

To achieve the foregoing objective, the embodiments of the present application provide a video information periodic broadcasting apparatus, including:
  a first segmenting unit, configured to segment video information with an equal duration to obtain video segments $S_i$ of each time series, where i is the segment serial number of the video segments, all the video segments $S_i$ are connected in series in an order of ascending the segment serial numbers to form the video information, and the time series is a duration of each video segment $S_i$ of a video program;

a second segmenting unit, configured to segment each video segment $S_i$ with an equal duration to obtain video sub-segments $S_{i,j}$ of each time series, where the number of the video sub-segments $S_{i,j}$ of each time series is equal to the segment serial number of the video segments corresponding to the same time series, i is the segment serial number of the video segments, j is the sub-segment serial numbers of all the video sub-segments of the video segment, and all the video sub-segments $S_{i,j}$ are connected in series in an order of ascending the sub-segment serial numbers to form the video segment $S_i$; and a first periodic broadcasting delivery unit, configured to transmit the video sub-segments of all the time series through at least two periodic broadcasting channels to implement video information periodic broadcasting.

To achieve the foregoing objective, the embodiments of the present application provide a video information receiving apparatus, including:

a video download request unit, configured to generate a video download request;

a determining unit, configured to determine, when a starting point of any one video sub-segment appears in any one periodic broadcasting channel, whether the video sub-segment is completely received in a time period of each time series by taking a generation moment of the video download request as a starting time; and a receiving unit, configured to receive, according to a determination result, the video sub-segment from the corresponding periodic broadcasting channel starting from a starting point of a video sub-segment that is not completely received.

To achieve the foregoing objective, the embodiments of the present application provide an electronic device, including a memory, a processor, and a computer program stored in the memory and running on the processor, where when the processor executes the computer program, the foregoing video information periodic broadcasting method or the foregoing video information receiving method is implemented.

To achieve the foregoing objective, the embodiments of the present application provide a readable storage medium, having a computer program stored thereon, where when the computer program is executed, steps of the foregoing video information periodic broadcasting method or the foregoing video information receiving apparatus is implemented.

In view of the above, compared with the prior art, this technical solution adopts a vertical dense segmentation method, and simultaneously places multiple segments in a same channel, so that multiple users can share channel resources, which not only reduces the overall video data traffic, but also effectively reduces the number of channels required for video transmission, greatly saving additional overheads required to maintain the transmission channel, ensuring the feasibility of engineering implementation, and maintaining the transmission bandwidth demand similar to the HB solution.

BRIEF DESCRIPTION OF THE DRAWINGS

To illustrate the technical solutions in the embodiments of the present application or the prior art more clearly, the drawings used in the description of the embodiments or the prior art are briefly described below. Apparently, the drawings in the following description are only some embodiments of the present application, and a person of ordinary skill in the art can obtain other drawings according to these drawings without involving any inventive effort.

FIG. 1 is a schematic diagram of a channel bandwidth in the HB solution;

DETAILED DESCRIPTION

Figure 2:
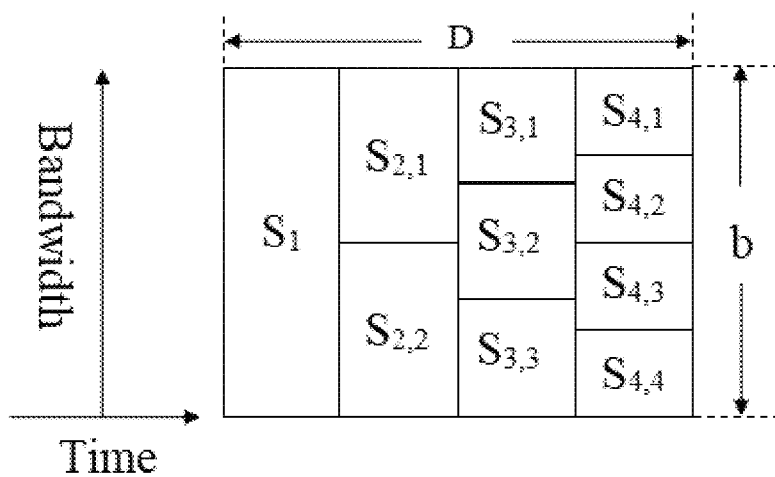
FIG. 2 is a schematic diagram of periodic broadcasting in the HB solution.

The technical solutions in the embodiments of the present disclosure are clearly and completely described below with reference to the accompanying drawings. With reference to non-limiting exemplary embodiments shown in the accompanying drawings and detailed in the following description, the exemplary embodiments of the present disclosure and various features and advantageous details thereof may be described more comprehensively. It should be noted that the features shown in the drawings are not necessarily drawn to scale. The present disclosure omits descriptions of known materials, components, and process technologies, so as not to obscure the exemplary embodiments of the present disclosure. The given examples are only intended to facilitate the understanding of the implementation of the exemplary embodiments of the present disclosure, and to further enable those skilled in the art to implement the exemplary embodiments. Therefore, these examples should not be construed as limiting the scope of the embodiments of the present disclosure.

Unless otherwise defined specifically, the technical terms or scientific terms used in the present disclosure shall have the general meanings understood by those of ordinary skills in the art to which the present disclosure belongs. The "first", "second" and similar words used in the present disclosure do not indicate any order, quantity or importance, but are only used to distinguish different components. In addition, in the various embodiments of the present disclosure, the same or similar reference numerals indicate the same or similar components.

Figure 12:
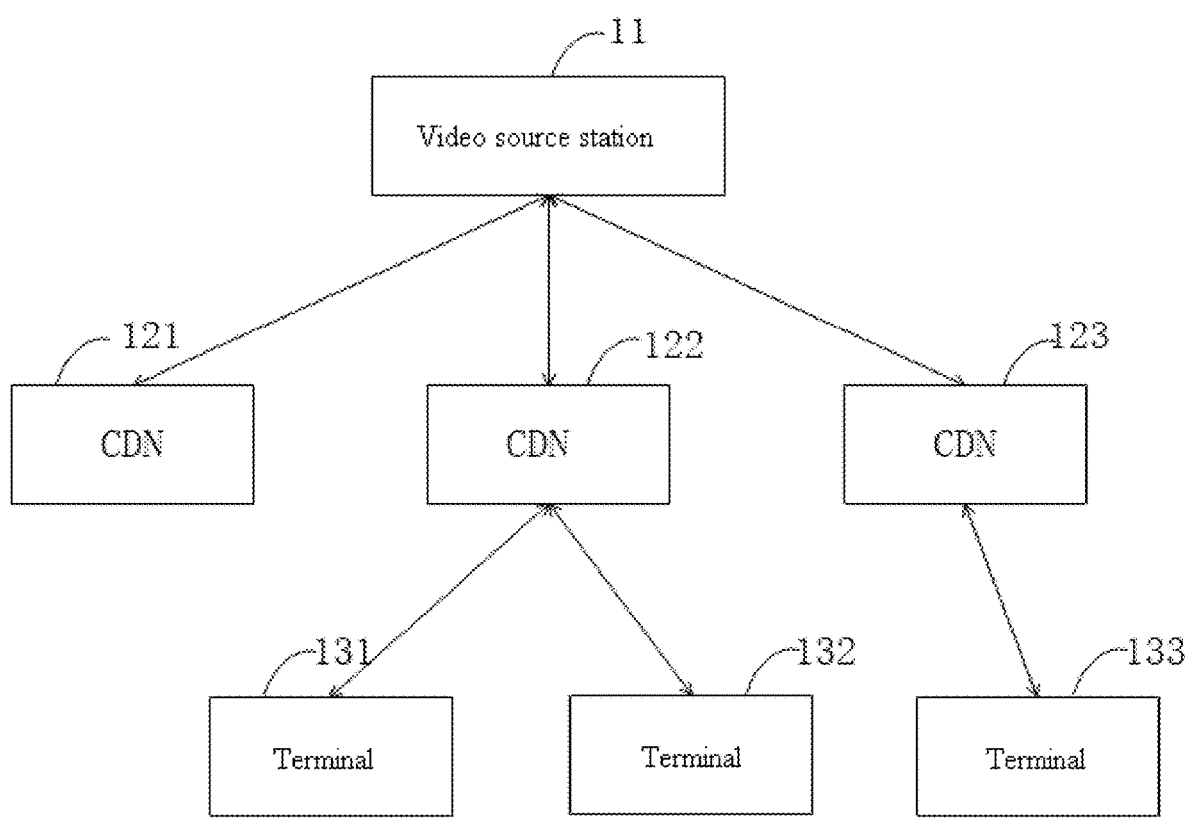
FIG. 12 is a schematic diagram of a network topology of a conventional CDN delivery technology.

FIG. 12 is a schematic diagram of a network topology of a conventional CDN delivery technology. Only the level-1 cache is described here. In the figures, 131, 132, and 133 all represent terminal devices, and 121, 122, and 123 all represent CDN nodes.

When the terminal device 131 sends a video-play request URL to a video source station 11, the video source station is redirected to the nearest CDN node 122 according to a corresponding CDN policy, so that the CDN node 122 provides video services to the terminal device. When the CDN node 122 corresponds to more and more terminal devices, and the CDN node 122 cannot meet the load, it is necessary to expand the capacity by increasing the capacity or number of CDN nodes.

Moreover, when the terminal device 131 and the terminal device 133 request broadcasting of a same program, assuming that the CDN node does not cache the program, then a request needs to be sent to the video source station 11, and the video source station transmits the same program to the CDN node 122 and the CDN node 123 at the same time, which causes a waste of bandwidth. In addition, the user's waiting time is very long.

In order to reduce the user's waiting time, improvements are made based on a conventional broadcasting solution. For example, if multiple channels are allocated to broadcast a same video program, there is still no need to use a client's cache. Assuming that five channels are allocated to a video program with a duration of 120 minutes for periodic broadcasting, the maximum waiting time of the users is 24 minutes. Therefore, the maximum waiting time of the users decreases linearly as the number of channels increases.

In order to save channel bandwidth, a PB-based solution is proposed. For example, the PB solution transmits those popular video programs using multiple channels, and at the same time, reduces the user's waiting time and bandwidth demand to the original square root size by taking advantage of the terminal's caching capabilities. In the PB solution, if the bandwidth allocated is larger, the user's waiting time may be improved exponentially. However, if the bandwidth allocated to each video program is not large enough, the PB solution has little improvement in the user's waiting time. For example, four channels are allocated to a video with a duration of 120 minutes, and the user's waiting time of the PB solution is greater than 19 minutes.

Under the condition that the size of the bandwidth allocated is determined, in order to reduce the user's waiting time, Li-Shen Juhn and Li-Ming Tseng propose an HB solution. The HB solution first segments a video into N segments with an equal duration, respectively denoted by $S_1$, $S_2, S_3, \ldots, S_N$. The durations of any two segments satisfies $D_i = D_j$. The $i^{th}$ segment $S_i$ is then horizontally and equally segmented into i sub-segments, respectively denoted by $S_{i,1}$, $S_{i,2}, \ldots, S_{i,i}$. As shown in FIG. 1, assuming an example of the HB solution that N equals to 4, a time sequence ID (slotID) is annotated above each broadcast segment in a channel $C_1$. In this example, a video with a duration of D is first equally segmented into four segments according to a duration, and then each segment is horizontally segmented into i equal sub-segments according to the size of the serial number i. Finally, all the sub-segments of each segment are individually put into a logic channel $C_i$, and broadcast in an order of ascending the sub-segment serial numbers. As shown in FIG. 2 (the ordinate Bandwidth in FIG. 2 represents a video playback rate b of broadcasting the entire video program, and the abscissa Time represents time), the bandwidth of the logic channel $C_i$ is b/i. broadcasting the entire video program are: In the logic channel $C_i$, each sub-segment is periodically broadcast. Therefore, the bandwidth demand for broadcasting the entire video program is:

$$B = \sum_{i=1}^{N} \frac{b}{i} = H_N * b \quad (1)$$

where N is the number of video segments, $H_N$ is a harmonic number of N, and b is the video playback rate.

When the total bandwidth allocated is determined, the user's waiting time of the HB solution is the theoretical lower limit of all broadcasting solutions. For example, when four video channels are allocated to a video with a program duration of 120 minutes, the waiting time of the HB solution is less than 4 minutes. However, the video segmentation mode in the HB solution is horizontal segmentation, which is difficult to achieve. Moreover, the number of logic channels in the HB solution increases linearly with the increase in the number of segments. For example, after a program is equally segmented into 50 segments, the HB solution requires 50 logic channels to transmit these segments. When the number of segments is large, such a channel design needs to consume lots of additional resources to maintain each logic channel.

Figure 3:
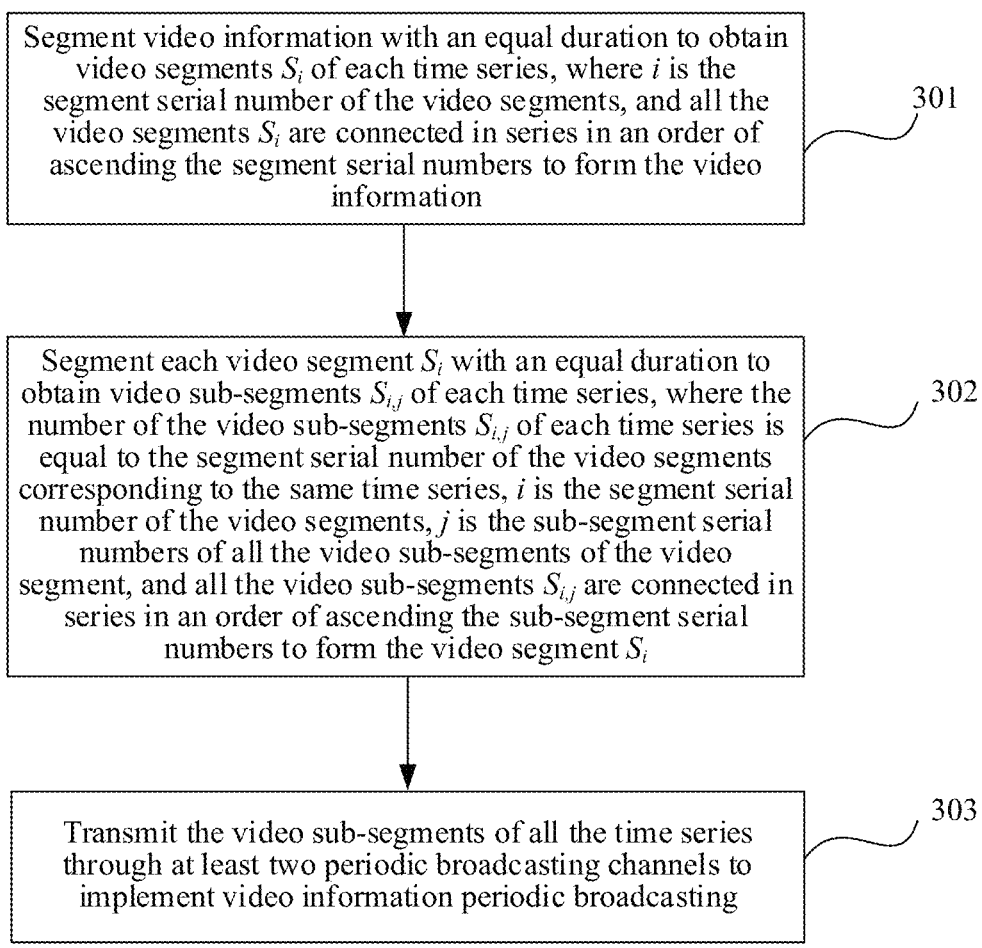
FIG. 3 is a flowchart of a video information periodic broadcasting method according to this technical solution.

On this basis, this technical solution provides a video information periodic broadcasting method, as shown in FIG. 3. The video information periodic broadcasting method can be applied to a CDN server. Specifically, the CDN server constitutes a CDN. The CDN is a CDN built on the Internet, relies on edge servers deployed in various places, and obtains the required video content after being used through a load balancing module, a content delivery module, a scheduling module and other functional modules of a central platform, reducing Internet congestion and increasing user's access response speed and hit rate. In this embodiment, the number of the CDN servers is not specifically limited. The CDN server may be a server, or several servers, or a server cluster formed by several servers. The method includes:

Step 301): Segment video information with an equal duration to obtain video segments $S_i$ of each time series, where i is the segment serial number of the video segments, and all the video segments $S_i$ are connected in series in an order of ascending the segment serial numbers to form the video information.

In this embodiment, assuming that there is a video program with a duration of D, and the playback rate of the video program is b, so the total size of the video is $S = D*b$. Taking a video program with a duration of 120 minutes as an example, if the playback rate is 10 Mbps, then the total size of the video is 9 Gbytes. Assuming that it is intended to reduce the user's waiting time to:

$$T = D/N \quad (2)$$

where N is a positive integer, and T is the user's waiting time.

In this technical solution, the video program is equally segmented into N segments. $S_i$ is the $i^{th}$ segment of the video program. The duration of each $S_i$ is d. The duration d is called a time series. All the segments are connected in series in an order of ascending segment serial numbers to form the entire video program.

Step 302): Segment each video segment $S_i$ with an equal duration to obtain video sub-segments $S_{i,j}$ of each time series, where the number of the video sub-segments of each time series is equal to the segment serial number of the video segments corresponding to the same time series, i is the segment serial number of the video segments, j is the sub-segment serial numbers of all the video sub-segments of the video segment, and all the video sub-segments $S_{i,j}$ are connected in series in an order of ascending the sub-segment serial numbers to form the video segment $S_i$.

Figure 4:
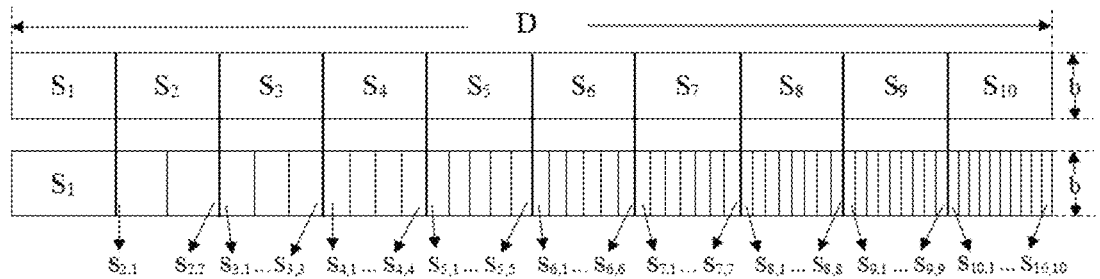
FIG. 4 is a schematic diagram of video segmentation according to this technical solution.

In this technical solution, the $i^{th}$ segment $S_i$ of the video program is equally segmented into i sub-segments. $S_{i,j}$ is the $j^{th}$ sub-segment of the segment $S_i$, and all the sub-segments are connected in series in an order of ascending the segment serial numbers to form the entire segment. The size of $S_{i,j}$ is $S_i/i$. As shown in FIG. 4, an example of video segmentation in this technical solution is shown, where N=10. First, the video is equally segmented into 10 segments, and then the $i^{th}$ segment $S_i$ of the video is equally segmented into i sub-segments.

Step 303): Transmit the video sub-segments of all the time series through at least two periodic broadcasting channels to implement video information periodic broadcasting.

In this technical solution, the step of transmitting the video sub-segments of all the time series through at least two periodic broadcasting channels includes:

successively placing first video sub-segments of each video segment at corresponding positions in a space of a first time series of a corresponding periodic broadcasting channel in an order of ascending the serial numbers of periodic broadcasting signals based on the sizes of the first video sub-segments of each video segment according to the order of ascending the segment serial numbers; and in a space of any other time series k in all periodic broadcasting channels, making the positions of the video sub-segments $S_{i,j}$ of each video segment $S_i$ in the periodic broadcasting channel the same as the positions of the first video sub-segments $S_{i,1}$ of the corresponding video segment in the space of the first time series of the periodic broadcasting channel; where j=(k−1) mod i+1.

In practice, in the case of only one periodic broadcasting channel, the video program in the periodic broadcasting channel using a program duration as a period is cyclically delivered.

Figure 5A:
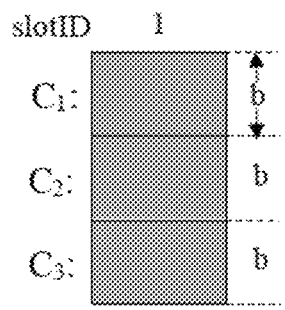
FIG. 5a is a first schematic diagram of video segment placement according to this technical solution.
Figure 5B:
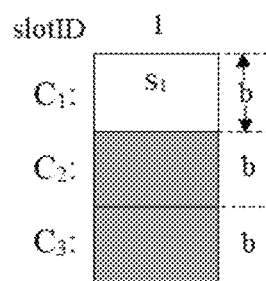
FIG. 5b is a second schematic diagram of video segment placement according to this technical solution.
Figure 5C:
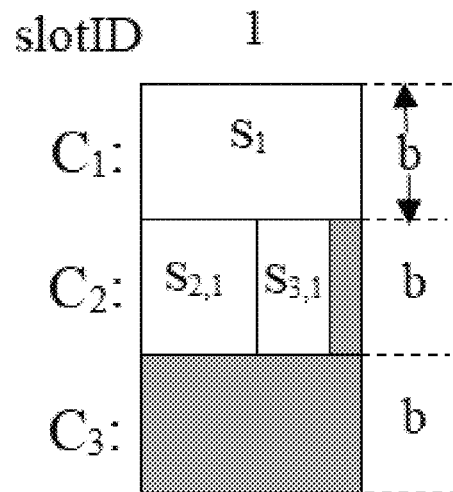
FIG. 5c is a third schematic diagram of video segment placement according to this technical solution.
Figure 5D:
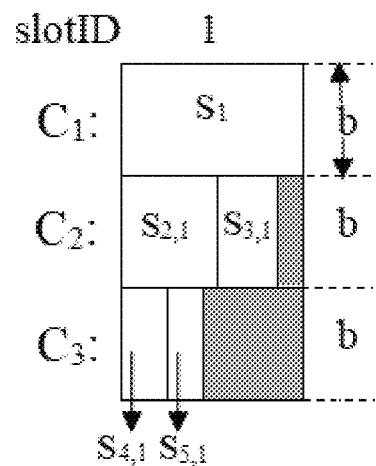
FIG. 5d is a fourth schematic diagram of video segment placement according to this technical solution.
Figure 5E:
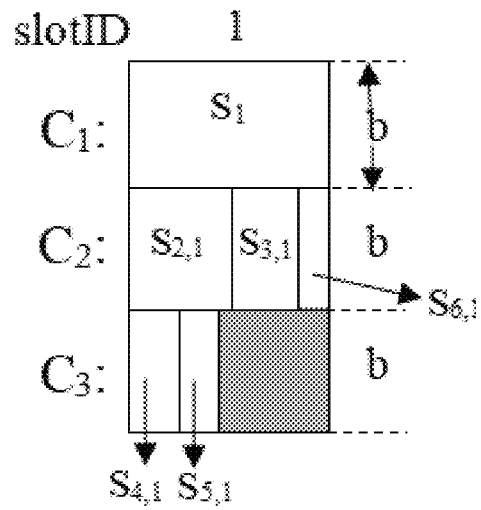
FIG. 5e is a fifth schematic diagram of video segment placement according to this technical solution.
Figure 5F:
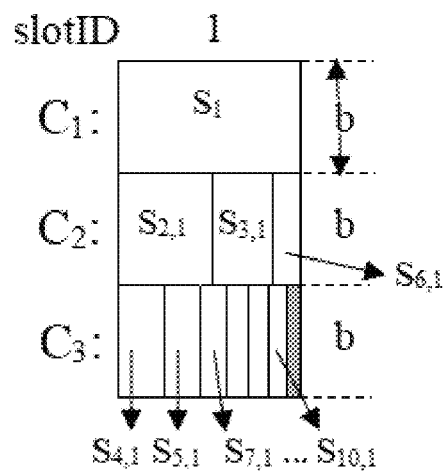
FIG. 5f is a sixth schematic diagram of video segment placement according to this technical solution.

In this embodiment, assuming that there are enough channels for transmitting the video program, the transmission bandwidth of each channel is equal. Taking N=10 as an example, in consideration of the arrangement of sub-segments in each channel of a first time series: a sub-segment $S_{1,1}$ is first placed in a channel C1, in this case, the remaining space of $C_1$ in the first time series is 0, as shown in FIG. 5a and FIG. 5b. The shaded part indicates the remaining space in the channel. Unshaded elements indicate sub-segments that are arranged. $S_{2,1}$ is then placed in a channel $C_2$, in this case, $C_2$ has d/2 space left in the first time frame. Then $S_{3,1}$ is placed in the channel $C_2$, in this case, $C_2$ only has d/6 space left, which is not enough to accommodate $S_{4,1}$. Therefore, $S_{4,1}$ is placed in a channel $C_3$, in this case, $C_3$ has 3d/4 space left. Then $S_{5,1}$ is placed in a channel $C_3$, and $C_3$ has 11d/20 space left. During placement of $S_{6,1}$, because the remaining space of channel $C_2$ is enough to accommodate $S_{6,1}$, the segment $S_{6,1}$ is placed in the channel $C_2$, and the remaining space of $C_2$ is 0, and then sub-segments $S_{7,1}$, $S_{8,1}$, $S_{9,1}$, and $S_{10,1}$, as shown in FIG. 5c, FIG. 5d, FIG. 5e, and FIG. 5f. Such an arrangement is actually a greedy algorithm. Specifically, the sub-segments of each segment are placed in the remaining space of the channel with the smaller serial number as much as possible. These four sub-segments can be placed in the channel $C_3$, and the remaining space of $C_3$ is 179d/2520.

The above is the position arrangement of the sub-segments in the channel in the first time series. On this basis, in any time series k, the positions of the sub-segments $S_{i,j}$ belonging to the segment $S_i$ in the channel are the same as the positions of the sub-segments $S_{i,j}$ in the channel in the first time frame. j=(k−1) mod i+1. For example, the sub-segments of the segment $S_6$ in the tenth time series are $S_{6,4}$, and the sub-segments $S_{6,4}$ in the time series are located at the tail end of the channel $C_2$. Each channel periodically broadcasts all sub-segments of the video in this mode.

Figure 6:
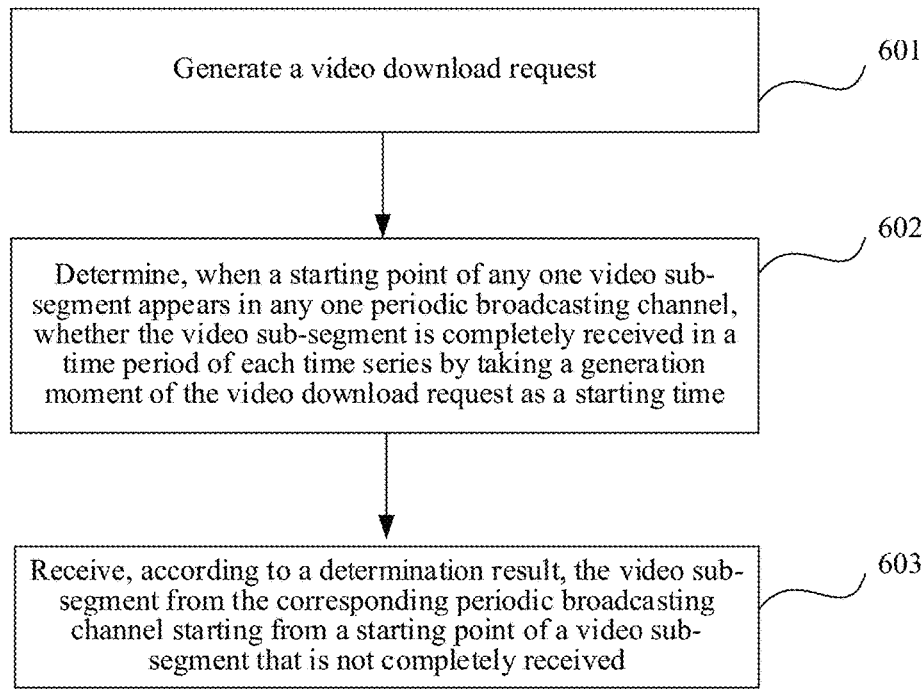
FIG. 6 is a flowchart of a video information receiving method according to this technical solution.

FIG. 6 is a flowchart of a video information receiving method according to this technical solution. The method includes:

Step 601): Generate a video download request.

Step 602): Determine, when a starting point of any one video sub-segment appears in any one periodic broadcasting channel, whether the video sub-segment is completely received in a time period of each time series by taking a generation moment of the video download request as a starting time.

Step 603): Receive, according to a determination result, the video sub-segment from the corresponding periodic broadcasting channel starting from a starting point of a video sub-segment that is not completely received.

Assuming that there is enough space on the client to cache part of the video being played. When watching a video, a user waits to download video data until the starting point of any sub-segment in any channel is encountered. Assuming that the user starts downloading the video data at a moment $T_0$. The user has to follow the following steps when receiving segments:

1) In a period of a time series, i.e., in a time period from $T_0$ to $T_0+d$, when a starting point of any sub-segment $S_{i,j}$ appears in any channel $C_i$ (1≤i≤channelID$_{max}$), the user starts downloading the video data from the channel $C_i$. Assuming that the moment when the user starts downloading the sub-segment $S_{i,j}$ is $T_0+\delta_i$ (0≤$\delta_i$<1), where $\delta_i$ is the time elapsed from the moment $T_0$ until the starting point of the sub-segment $S_{i,j}$ is encountered.

2) When the segment $S_i$ is completely received by the user, the user stops receiving the segment $S_i$ from the channel $C_j$ where $S_i$ is located. When a starting point of sub-segments of a segment $S_k$ that is not received completely appears in the channel $C_j$, the user continues to receive video data from the channel $C_j$. For the segment $S_i$, the user stops receiving all its sub-segments at a moment $T_0+(i−1)d+\delta_i$.

Figure 7:
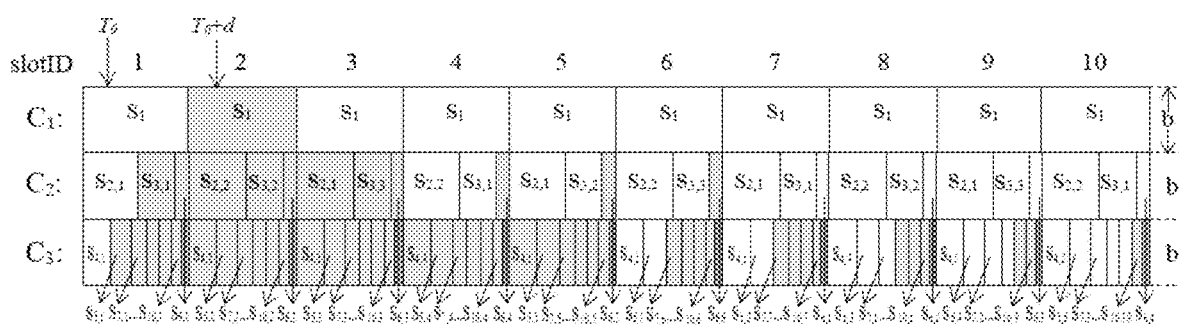
FIG. 7 is a schematic diagram of a client receiving video segments based on this technical solution.

3) In order to ensure that the video can be played continuously, the time point when the user starts watching the vide is postponed for a period of time. If the user starts downloading the video data at the moment $T_0$, as shown in FIG. 7, the light shaded part in FIG. 7 is a video segment received by the user who starts receiving the video from the moment $T_0$ and watching the video from the moment $T_0+d$, then the video segment is received by the user who starts watching the video at the moment $T_0+d$, implementing uninterrupted viewing of the video.

This technical solution improves the original segmentation mode and channel relationship while maintaining the specific low transmission bandwidth demand of the HB algorithm, so that this technical solution is easy to implement by engineering. However, the bandwidth required by this technical solution in transmission of the video program is close to the theoretical lower limit of the periodic broadcasting algorithm, and this technical solution is suitable for scenarios where the channel bandwidth cannot be changed once it is determined. Furthermore, it can be seen from FIG. 7 that the user can watch the video by waiting for a time period of a time series after sending a video watching request.

Figure 13:
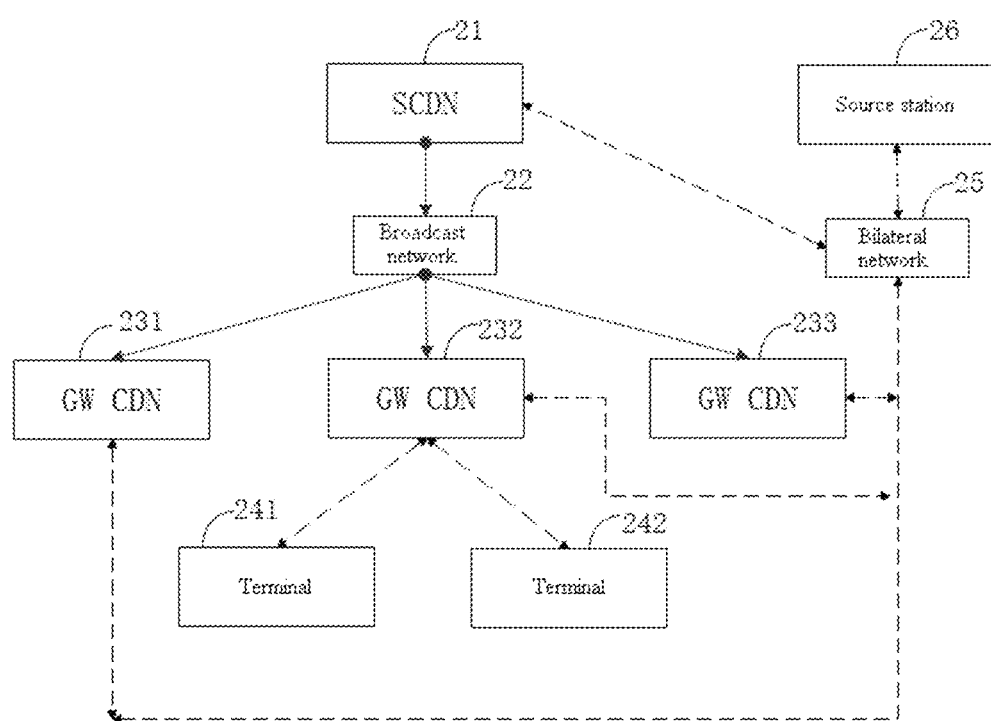
FIG. 13 is a schematic diagram of a network topology according to this technical solution.

FIG. 13 is a schematic diagram of a network topology according to this technical solution. In 13, 21 represents SCDN, and 231, 232, and 233 all represent GW CDN (gateway CDN), which is similar to a home router device. Compared with FIG. 12, there is only one CDN.

CDN and GW CDN deliver in a multicast network mode, as shown in FIG. 22, so that the overlaying bandwidth traffic of repeated popular video streams can be transmitted on the basis of a few network bandwidth. Even if the number of terminals is increased, the network capacity does not need to be increased, and only one CDN is deployed. There is a two-way network connection between CDN and GW CDN at the same time, for transmitting interactive signaling and some low-speed network data.

Figure 14:
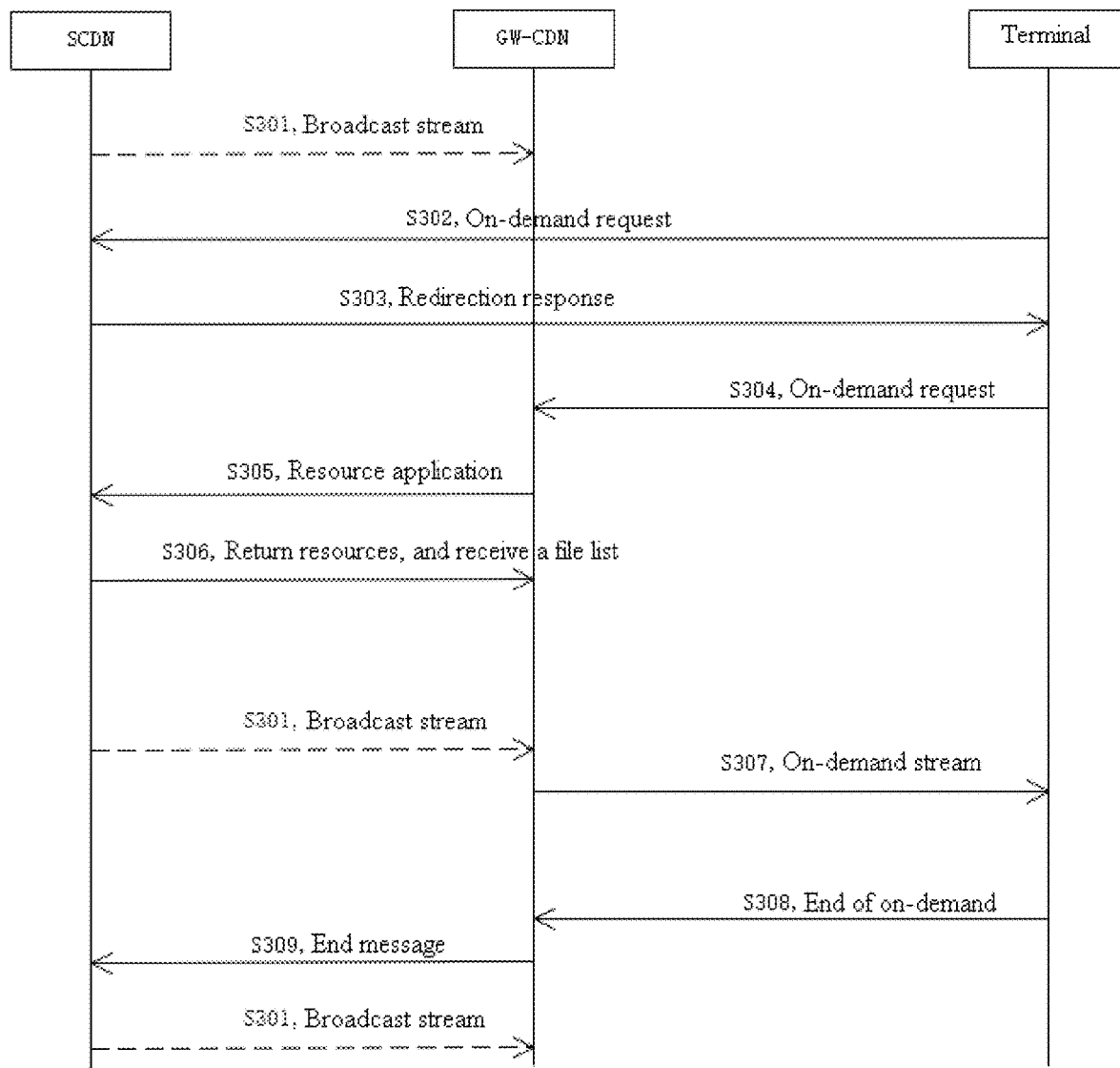
FIG. 14 is a flowchart of VOD according to this technical solution.

FIG. 14 shows the VOD process based on this technical solution, and the detailed process is described as follows:

S301: An SCDN determines a target popular video. The target popular video is transferred from VOD on-demand to periodic broadcasting transmission. First, the target popular video is segmented. The target popular video is segmented with an equal duration to obtain video segments $S_i$ of each time series, where i is the segment serial number of the video segments, and all the video segments $S_i$ are connected in series in an order of ascending the segment serial numbers to form the video information. Each video segment $S_i$ is segmented with an equal duration to obtain video sub-segments $S_{i,j}$ of each time series, where the number of video sub-segments $S_{i,j}$ of each time series is equal to the segment serial number of the video segments corresponding to the same time series, i is the segment serial number of the video segments, j is the sub-segment serial numbers of all the video sub-segments of the video segment, and all the video sub-segments $S_{i,j}$ are connected in series in an order of ascending the sub-segment serial numbers to form the video segment $S_i$. The video sub-segments of all time series are transmitted through periodic broadcasting channels. The target popular video is sent to a broadcast network.

S302: The terminal generates a video-play request, and initiates downloading of the target popular video. The video-play request is a URL. First, DNS resolution is performed on the URL, and a DNS server maps a domain name to a corresponding IP address of the SCDN according to the policy, so that the request arrives at the SCDN first, for example, it is requested to resolve the URL to http://www.scdn.com/a.mp4.

S303: After receiving the request, the SCDN performs request checking to query whether there is a related film source and whether the film source is being broadcast. When the playback start-up requirements are met, a redirection response is returned, and the related URL of the GW CDN is returned. For example, the redirection URL can be set as http://gw_cdn.com/a.mp4.

S304: The terminal sends the request to the GW CDN according to the redirection URL. It is necessary to configure DNS mapping on a local area network of the terminal device, and associate the domain name of gw_cdn.com with the IP address of the GW CDN. The GW CDN device may be deployed on each local area subnet.

S305: The GW CDN sends a request to the SCDN. The request includes the name and number information of the on-demand video source, and the request exchange format is a JSON format that is easy to read and extensible.

S306: The SCDN returns information of the periodic broadcasting channel, including an IP address, a port or a frequency point, and a PID of the related periodic broadcasting channel.

S307: The GW CDN receives segment data, sorts the segment data, caches the first arrived segment, and integrates stream data into a protocol format supported by the terminal for playback.

S308: When the playback ends, the terminal sends an end message to the GW CDN, and the GW CDN stops receiving streams from the broadcasting channel, and also stops sending streams to the terminal, and clears the playback control state.

S309: The GW CDN forwards the playback end message to the SCDN, and the SCDN updates the playback state synchronously, and clears the related state and database at the same time.

The periodic broadcasting implementation in this solution adopts a segment multi-channel delivery mode. The first video sub-segments of each video segment are successively placed at corresponding positions in a space of a first time series of a corresponding periodic broadcasting channel in an order of ascending the serial numbers of periodic broadcasting signals based on the sizes of the first video sub-segments of each video segment according to the order of ascending the segment serial numbers, and in a space of any other time series k in all periodic broadcasting channels, the positions of the video sub-segments $S_{i,j}$ of each video segment $S_i$ in the periodic broadcasting channel are the same as the positions of the first video sub-segments $S_{1,1}$ of the corresponding video segment in the space of the first time series of the periodic broadcasting channel. In this way, whenever a viewer plays from the beginning of the film source, the waiting time is extremely short. The waiting time depends on the granularity of the segment, which is generally controlled within a few seconds. In this way, from the effect of terminal playback, there is no difference from the conventional Internet on-demand in the streaming time and fluency.

Figure 8:
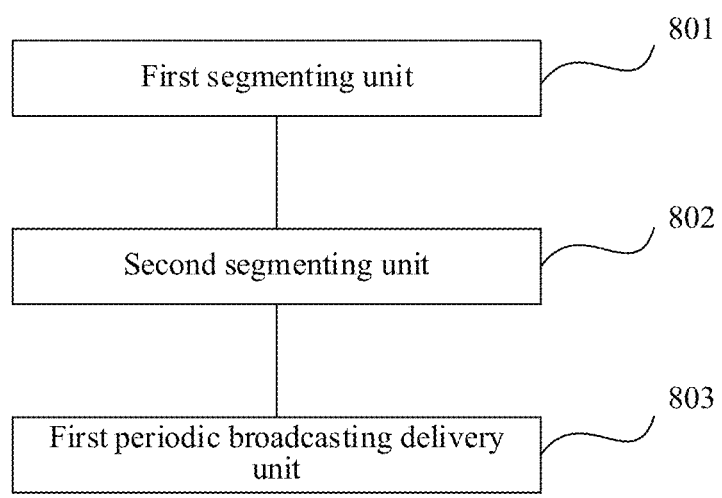
FIG. 8 is a functional block diagram of a video information periodic broadcasting apparatus according to this technical solution.

FIG. 8 is a functional block diagram of a video information periodic broadcasting apparatus according to this technical solution. The apparatus includes:

a first segmenting unit 801, configured to segment video information with an equal duration to obtain video segments $S_i$ of each time series, where i is the segment serial number of the video segments, and all the video segments $S_i$ are connected in series in an order of ascending the segment serial numbers to form the video information;

a second segmenting unit 802, configured to segment each video segment $S_i$ with an equal duration to obtain video sub-segments $S_{i,j}$ of each time series, where the number of the video sub-segments $S_{i,j}$ of each time series is equal to the segment serial number of the video segments corresponding to the same time series, i is the segment serial number of the video segments, j is the sub-segment serial numbers of all the video sub-segments of the video segment, and all the video sub-segments $S_{i,j}$ are connected in series in an order of ascending the sub-segment serial numbers to form the video segment $S_i$; and a first periodic broadcasting delivery unit 803, configured to transmit the video sub-segments of all the time series through at least two periodic broadcasting channels to implement video information periodic broadcasting.

Figure 9:
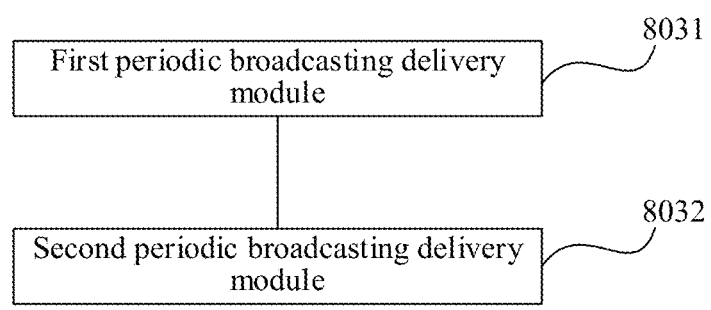
FIG. 9 is a functional block diagram of a periodic broadcasting unit in a video information periodic broadcasting apparatus according to this technical solution.

FIG. 9 is a functional block diagram of a periodic broadcasting unit in the video information periodic broadcasting apparatus according to this technical solution. the first periodic broadcasting delivery unit 803 includes:

a first periodic broadcasting delivery module 8031, configured to successively place first video sub-segments of each video segment at corresponding positions in a space of a first time series of a corresponding periodic broadcasting channel in an order of ascending the serial numbers of periodic broadcasting signals based on the sizes of the first video sub-segments of each video segment according to the order of ascending the segment serial numbers; and a second periodic broadcasting delivery module 8032, configured to make, in a space of any other time series k in all periodic broadcasting channels, the positions of the video sub-segments $S_{i,j}$ of each video segment $S_i$ in the periodic broadcasting channel the same as the positions of the first video sub-segments $S_{i,1}$ of the corresponding video segment in the space of the first time series of the periodic broadcasting channel; where $j=(k-1) \bmod i+1$.

In this embodiment, the apparatus further includes:

a second periodic broadcasting delivery subunit, configured to cyclically deliver, in the case of only one periodic broadcasting channel, the video program in the periodic broadcasting channel using a program duration as a period.

In this embodiment, the apparatus further includes:

a channel bandwidth determining unit, configured to determine a bandwidth of the periodic broadcasting channel according to a playback bitrate of the video information.

Figure 10:
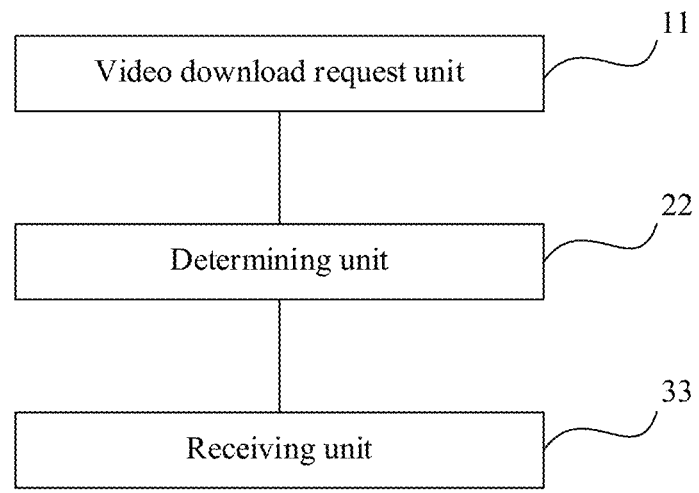
FIG. 10 is a functional block diagram of a video information receiving apparatus according to this technical solution.

FIG. 10 is a functional block diagram of a video information receiving apparatus according to this technical solution. The apparatus includes:

a video download request unit 11, configured to generate a video download request;

a determining unit 22, configured to determine, when a starting point of any one video sub-segment appears in any one periodic broadcasting channel, whether the video sub-segment is completely received in a time period of each time series by taking a generation moment of the video download request as a starting time; and a receiving unit 33, configured to receive, according to a determination result, the video sub-segment from the corresponding periodic broadcasting channel starting from a starting point of a video sub-segment that is not completely received.

In this embodiment, the apparatus further includes:

a display unit, configured to display the received video sub-segment from the generation moment of the video download request after the time period of a time series.

Figure 11:
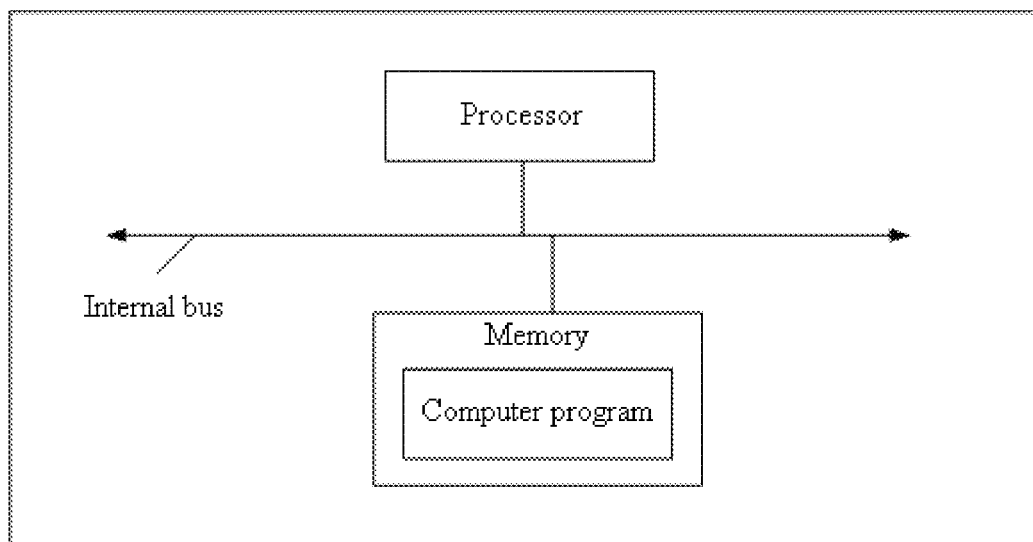
FIG. 11 is a schematic diagram of an electronic device according to this technical solution.

FIG. 11 is a schematic diagram of an electronic device according to the embodiments of the present application. The electronic device includes a memory, a processor, and a computer program stored in the memory and running on the processor, where when the processor executes the computer program, the foregoing video information periodic broadcasting method or the foregoing vide information receiving method is implemented.

In the video information periodic broadcasting method or the video information receiving method provided by the embodiments of the specification, the specific functions realized by the memory and the processor can be explained in comparison with the foregoing embodiments in the specification, and can achieve the technical effects of the foregoing embodiments, and details are not described herein.

In this embodiment, the memory may include a physical apparatus for storing information, which generally digitizes the information and then stores the digitized information in a medium using an electrical, magnetic, or optical method. The memory described in this embodiment may also include: an apparatus that stores information in an electric energy mode, such as a RAM and a ROM; an apparatus that stores information in a magnetic energy mode, such as a hard disk, a floppy disk, a magnetic tape, a magnetic core memory, a magnetic bubble memory, and a USB flash disk; and an apparatus that stores information in an optical mode, such as a CD or a DVD. Certainly, there are other types of memories, such as a quantum memory and a graphene memory.

In this embodiment, the processor may be implemented in any suitable manner. For example, the processor may take the form of, for example, a microprocessor or a processor, and a computer-readable medium storing computer readable program codes (for example, software or firmware) executed by the (micro)processor, a logic gate, a switch, an Application Specific Integrated Circuit (ASIC), a programmable logic controller and an embedded microcontroller, etc.

In this embodiment, the embodiments of the present application further provide a readable storage medium, having a computer program stored thereon, where when the computer program is executed, steps of the foregoing video information periodic broadcasting method or steps of the foregoing video information receiving method are implemented.

In view of the above, this technical solution adopts a vertical dense segmentation method, and simultaneously places multiple segments in a same channel, so that multiple users can share channel resources, which not only reduces the overall video data traffic, but also effectively reduces the number of channels required for video transmission, greatly saving additional overheads required to maintain the transmission channel, ensuring the feasibility of engineering implementation, and maintaining the transmission bandwidth requirements similar to the HB solution.

In the 1990s, the improvement of a technology can be clearly distinguished between a hardware improvement (for example, an improvement to a circuit structure of a diode, a transistor, a switch, etc.) or a software improvement (an improvement to a method flow). However, with the development of technology, the improvements of many current method flows can be regarded as direct improvements to the hardware circuit structure. Designers almost always obtain the corresponding hardware circuit structure by programming the improved method flow into the hardware circuit. Therefore, it cannot be said that the improvement of a method flow cannot be realized by hardware entity modules. For example, a Programmable Logic Device (PLD) (for example, a Field Programmable Gate Array (FPGA)) is such an integrated circuit, a logic function of which is determined by the user's programming of the device. It is programmed by the designer to "integrate" a digital system onto a PLD, without inviting a chip manufacturer to design and manufacture a dedicated integrated circuit chip. Moreover, nowadays, instead of manually manufacturing integrated circuit chips, this programming is mostly realized by using "logic compiler" software, which is similar to a software compiler used in program development and writing, and an original code before compilation is also written in a specific programming language, which is called Hardware Description Language (HDL), and there are many HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL). Currently, the most commonly used are Very-High-Speed Integrated Circuit Hardware Description Language (VHDL) and Verilog2. It should also be clear to those skilled in the art that the hardware circuit implementing the logic method flow can be easily obtained only by logically programming the method flow in some of the foregoing hardware description languages and programming into an integrated circuit.

Those skilled in the art also know that, in addition to realizing the client and the server in a purely computer readable program code manner, it is entirely possible to logically program the method steps, so that the client and the server can realize the same functions in the form of the logic gate, the switch, the ASIC, the programmable logic controller and the embedded microcontroller, etc. Therefore, the client and the server can be regarded as hardware components, and the apparatuses included in the client and the server for realizing various functions can also be regarded as structures inside the hardware components. Or even, the apparatuses for realizing various functions can be regarded as both software modules for realizing the method and structures inside the hardware components.

From the descriptions of the foregoing embodiments, it can be known that those skilled in the art can clearly understand that the present application can be implemented by means of software plus necessary general hardware platforms. Based on such an understanding, the technical solutions of the present application essentially or the part contributing to the prior art may be embodied in the form of a software product. The computer software product is stored in a storage medium, such as the ROM/RAM, the magnetic disk, and the optical disk, and includes several instructions for instructing a computer device (which may be a personal computer, a server, or a network device, etc.) to execute the methods described in embodiments of the present application or some parts of the embodiments.

The various embodiments in the specification are described in a progressive manner, and the same or similar parts between the various embodiments may be referred to each other, and each embodiment focuses on the differences from other embodiments. In particular, the embodiment of the client and the server can be explained with reference to the introduction of the embodiment of the foregoing method.

The present application can be described in the general context of computer executable instructions executed by a computer, such as a program module. Generally, the program modules include routines, programs, objects, components, data structures, etc. that execute particular tasks or implement particular abstract data types. The present application can also be practiced in distributed computing environments where tasks are executed by remote processing devices that are connected through a communication network. In the distributed computing environments, the program modules can be located in both local and remote computer storage media including storage devices.

Although the present application is described through the embodiments, those of ordinary skill in the art know that there are many variations and changes in the present application, without departing from the spirit of the present application, and it is hoped that the appended claims include these variations and changes, without departing from the spirit of the present application.

The invention claimed is:

1. A video information receiving method, comprising:
generating a video download request;
determining, when a starting point of any one video sub-segment appears in any one periodic broadcasting channel, whether the video sub-segment is completely received in a time period of each time series by taking a generation moment of the video download request as a starting time; and
receiving, according to a determination result, the video sub-segment from the corresponding periodic broadcasting channel starting from a starting point of a video sub-segment that is not completely received,
wherein
in a time period from $T_0$ to $T_0+d$, when a starting point of the a video sub-segment $S_{i,j}$ appears in the a periodic broadcasting channel $C_i$ ($1 \leq i \leq$ channe $IID_{max}$), downloading the video sub-segment $S_{i,j}$ from the periodic broadcasting channel $C_i$ at a moment $T_0+\delta_i$ ($0 \leq \delta_i \leq 1$), where $\delta_i$ is the time elapsed from the moment $T_0$ until the starting point of the video sub-segment $S_{i,j}$ is encountered,
in response to a video segment $S_i$ being completely received, stopping to receive the video segment $S_i$ from the periodic broadcasting channel $C_j$ where $S_i$ is located,
in response to a starting point of video sub-segments of a video segment $S_k$ that is not received completely appearing in the periodic broadcasting channel $C_j$, continuing to receive video data from the periodic broadcasting channel $C_j$, and stopping to receive all video sub-segments of the video segment $S_i$ at a moment $T_0+(i-1) d+\delta_i$, and
in response to starting to download the video segment $S_i$ at the moment $T_0$, receiving the video segment $S_i$ at the moment $T_0+d$ to ensure that a video can be played continuously without interruption.

2. The video information receiving method according to claim 1, further comprising:
displaying the received video sub-segment from the generation moment of the video download request after the time period of a time series.

3. A video information receiving apparatus, comprising:
a video download request unit, configured to generate a video download request;
a determining unit, configured to determine, when a starting point of any one video sub-segment appears in any one periodic broadcasting channel, whether the video sub-segment is completely received in a time period of each time series by taking a generation moment of the video download request as a starting time; and
a receiving unit, configured to receive, according to a determination result, the video sub-segment from the corresponding periodic broadcasting channel starting from a starting point of a video sub-segment that is not completely received,
wherein
in a time period from $T_0$ to $T_0+d$, when a starting point of the a video sub-segment $S_{i,j}$ appears in the a periodic broadcasting channel $C_i$ ($1 \leq i \leq$ channe $IID_{max}$), downloading the video sub-segment $S_{i,j}$ from the periodic broadcasting channel $C_j$ at a moment $T_0+\delta_i$ ($0 \le \delta_i < 1$) by the receiving unit, where $\delta_i$ is the time elapsed from the moment $T_0$ until the starting point of the video sub-segment $S_{i,j}$ is encountered, in response to a video segment $S_i$ being completely received, stopping to receive the video segment $S_i$ from the periodic broadcasting channel $C_j$ where $S_i$ is located, in response to a starting point of video sub-segments of a video segment $S_k$ that is not received completely appearing in the periodic broadcasting channel $C_j$, continuing to receive video data from the periodic broadcasting channel $C_j$, and stopping to receive all video sub-segments of the video segment $S_i$ at a moment $T_0+(i-1)$ $d+\delta_i$, and in response to starting to download the video segment $S_i$ at the moment $T_0$, receiving the video segment $S_i$ at the moment $T_0+d$ to ensure that a video can be played continuously without interruption.

4. The video information receiving apparatus according to claim 3, further comprising:

a display unit, configured to display the received video sub-segment from the generation moment of the video download request after the time period of a time series.

5. An electronic device, comprising a memory, a processor, and a computer program stored in the memory and running on the processor, wherein when the processor executes the computer program, the video information receiving method according to claim 1 is implemented.

6. A non-transitory readable storage medium, having a computer program stored thereon, wherein when the computer program is executed, steps of the video information receiving method according to claim 1 are implemented.

* * * * *